United States Patent [19]

Bolger

[11] 3,882,495
[45] May 6, 1975

[54] DOPPLER CORRELATION RADAR PROVIDING COARSE-RANGE DETECTION RESOLUTION

[75] Inventor: Thomas Vincent Bolger, Pennsauken, N.J.

[73] Assignee: RCA Corporation, New York, N.Y.

[22] Filed: June 11, 1973

[21] Appl. No.: 368,869

[52] U.S. Cl. ........ 343/5 PD; 340/258 A; 343/5 SA; 343/7.7
[51] Int. Cl. ...................... G01s 9/42; G08b 13/22
[58] Field of Search .... 340/258 A; 343/5 PD, 5 SA, 343/7.7

[56] References Cited
UNITED STATES PATENTS

| 3,181,150 | 4/1965 | Ruppersberg et al. | 340/258 A |
| 3,386,094 | 5/1968 | Kratzer et al. | 343/7.7 X |
| 3,386,095 | 5/1968 | Stevens | 343/7.7 X |
| 3,388,398 | 6/1968 | Kratzer et al. | 343/7.7 X |
| 3,614,785 | 10/1971 | Kratzer | 343/7.7 |
| 3,716,823 | 2/1973 | Thompson et al. | 343/5 SA X |
| 3,728,721 | 4/1973 | Lee et al. | 340/258 A X |
| 3,733,603 | 5/1973 | Johnston | 343/5 SA |
| 3,778,828 | 12/1973 | McFarland | 343/7.7 |
| 3,781,859 | 12/1973 | Hermans | 343/7.7 X |
| 3,790,938 | 2/1974 | Anderson et al. | 343/7.7 |

Primary Examiner—Malcolm F. Hubler
Attorney, Agent, or Firm—Edward J. Norton; George J. Seligsohn

[57] ABSTRACT

Special types of transmitted code and decoding signals for different selected range subintervals within the maximum range of interest result in the optimization of range sensitivity for each subinterval.

9 Claims, 6 Drawing Figures

DOPPLER CORRELATION RADAR PROVIDING COARSE-RANGE DETECTION RESOLUTION

This invention relates to doppler correlation radar systems and, more particularly, to such a system which maximizes range sensitivity as a function of target type and provides a coarse range resolution which can be used to optimize the detection of the different target types, which have different target velocities.

In U.S. Pat. No. 3,386,095, issued to G. H. Stevens on May 28, 1968, there is disclosed a doppler correlation radar system designed particularly for detecting and locating moving targets such as enemy soldiers or vehicles that are moving under cover of darkness or under cover of a forest, for example. In this system, a continuous wave carrier signal is phase modulated in accordance with a preselected binary code, received echo signals are mixed with the carrier signal then being transmitted, and the mixed output is correlated against a locally derived binary decoding signal to produce an audio doppler signal manifesting a moving target. The radar operator listens to the doppler audio signal over phones which are provided. This system may be alternatively operated either in an "all range" mode or a "range bins" mode, depending upon the position of a mode selection switch therein. In the all range position, one type of coding consisting of a pair of square wave signals, having certain preselected frequencies, are utilized respectively for the preselected code which phase modulates the carrier signal and for the locally derived code which is correlated against the mixed output. This provides a (STC) sensitivity time control that varies the receiver sensitivity as a function of the range of any received moving target so that the doppler signal amplitude of any moving target is substantially independent of the range of the target (i.e. the sensitivity of the receiver varies directly as a fourth power of the range of a moving target, since the power from a received echo of a moving target varies inversely as the fourth power of the range of that target). In the case of the range bins mode, another type of coding is utilized, which consists of a pseudo-random code as the transmitted preselected code. The same pseudo-random code with a selected delay is employed as the locally derived decoding signal.

In U.S. Pat. No. 3,614,785, issued to D. L. Kratzer on Oct. 19, 1971, there is disclosed a doppler correlation radar system which employs a novel preselected code for phase modulating the continuous carrier signal of the doppler correlation radar system which inherently is capable of providing both (STC) sensitive time control in the performance of the all range function of the system, while also being inherently capable of performing the range bins function of the system. This results in a doppler correlation radar system with two time-multiplexed channels for simultaneously manifesting both all range information and range bins information.

In manifesting all range information, both the doppler correlation radar system of U.S. Pat. No. 3,386,095 and U.S. Pat. No. 3,614,785 provide a single (STC) sensitivity time control for the entire range interval to the maximum range of interest. This single (STC) sensitivity time control is independent of target type and performs the sole function of making the received amplitude and power from any moving target substantially independent of range of that target. Moreover, the detection of a moving target in the all range mode gives no information at all of the range to that detected moving target. It is, therefore, necessary in the range bins mode to search throughout the entire group of different range bins until the particular range bin in which the detected target resides is located.

In practice, there are different types of targets, each with its own peculiar characteristics, which are to be detected and the range thereto determined. By way of example, the different types of targets may include (1) a crawling man, (2) a walking man, and (3) a moving vehicle. Since the relative velocities of these three different target types are different, with the velocity of a moving vehicle normally being greater than that of a walking man and that of a walking man normally being greater than that of a crawling man, each of these three different target types has a different doppler frequency signature. Further, these three target types have different radar cross sections, with the cross section of a moving vehicle normally being greater than that of a walking man and that of a walking man normally being greater than that of a crawling man. Thus, more receiver sensitivity is required to detect a crawling man than a walking man at the same range, or to detect a walking man than a moving vehicle at the same range. On the other hand, a crawling man is a threat over a shorter range interval than is a walking man, and a walking man is a threat over a shorter range interval than is a moving vehicle. It therefore would be desirable to tailor the target detection for each type of target rather than, as in the past, employing only a single all range mode for all types of targets.

Briefly, this is accomplished in the present invention by breaking up the maximum range of interest into a plurality of subintervals, such as three, equal in number to the different types of targets to be detected. These subintervals are preferably, but not necessarily, contiguous, non-overlapping and mutually exclusive. A different decode signal is employed for each range subinterval which has a predetermined wave shape selected to tend to optimize receiver sensitivity for the type target corresponding to that range subinterval. Thus, in the example discussed above, the maximum range interval is divided into three range subintervals, with the decode signal employed in the closest range subinterval being selected to provide a sensitivity sufficiently high to tend to optimize the detection of a crawling man, with the decode signal employed in the intermediate range subinterval being selected to provide a sensitivity sufficiently high to tend to optimize the detection of a walking man, and with the decode signal employed in the further range subinterval being selected to provide a sufficient sensitivity to nearly optimize the detection of moving vehicles. A secondary benefit of the present invention is that, unlike the prior art, it may be employed to provide coarse range resolution to any target type. Thus, in the range bins mode, target acquisition time is reduced, since it is now only necessary to search through the range bins of the range subinterval corresponding to the particular target then being observed.

Alternatively or in addition to the provision of coarse range resolution all range capability may still be provided by simultaneously decoding the received signal with all of the different decode signals in three parallel correlation decoding channels and then summing the outputs of the three channels.

These and other features and advantages of the present invention will become more apparent from the following detailed description taken together with the accompanying drawing, in which FIG. 1 is a block diagram of a typical doppler correlation radar system;

Figure 1:
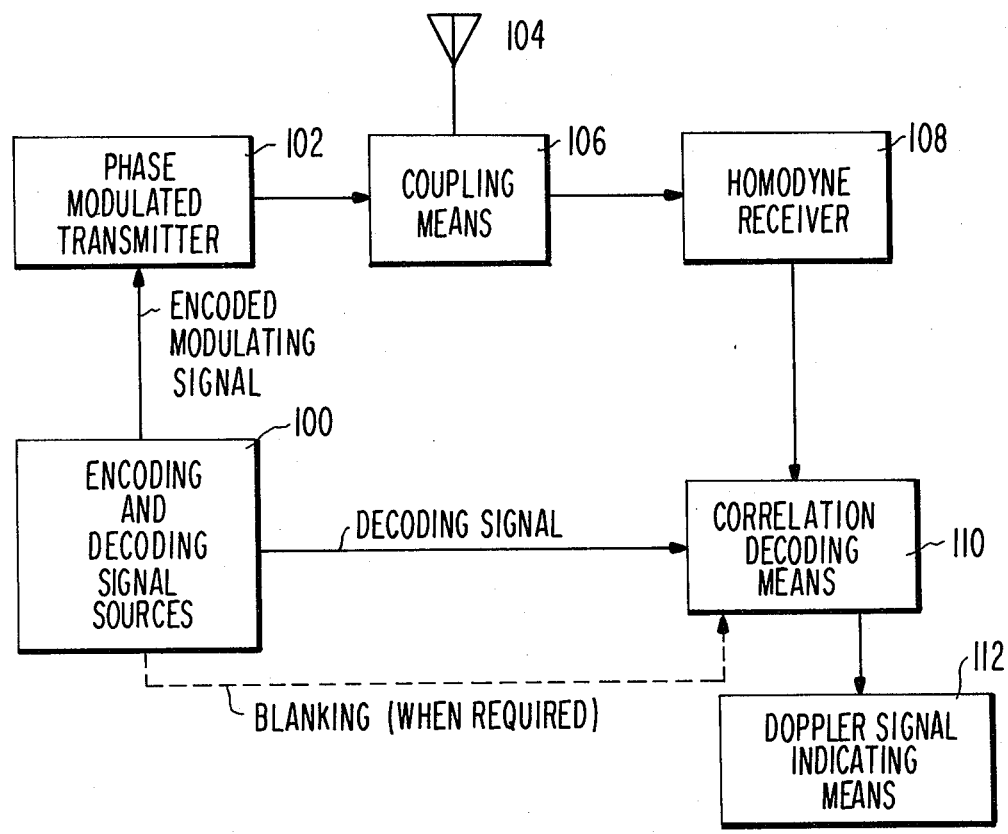

Referring to FIG. 1, there is shown a block diagram of a moving target correlation radar which is generic to the systems disclosed in each of the aforesaid U.S. Pat. Nos. 3,386,095 and 3,614,785, as well as the system of the present invention.

As shown in FIG. 1, encoding and decoding signal sources 100 applies an encoded modulating signal as an input to phase-modulated transmitter 102. By way of example, the carrier frequency of phase-modulator transmitter 102 may be at 9250 MHz. The encoded modulating signal is in the form of a stream of binary bits. The relative phase of the carrier-frequency output of transmitter 102, when phase modulated by bits manifesting a binary ONE, differs by substantially 180° from the carrier frequency output thereof when phase modulated by the bits manifesting a binary ZERO. The phase-modulated carrier frequency output transmitter 102 is forwarded to antenna 104 by coupling means 106, which may include a circulator. Coupling means 106 also couples a small portion of the phase-modulated output of transmitter 102 directly to the input of homodyne receiver 108. Antenna 104, besides transmitting the signal forwarded thereto by coupling means 106 from transmitter 102, also receives target echo signals. These target echo signals are forwarded by coupling means 106, such as through the circulator thereof, to the input of homodyne receiver 108. Homodyne receiver 108 includes a balanced mixer for heterodyning the target echo signal input thereto against the directly-forwarded input thereto from transmitter 102. Such hetrodyning results in a substantially zero beat baseband video signal in response to received echoes from all stationary targets. However, in response to received echoes from a moving target, such hetrodyning results in a non-ZERO beat signal which includes a doppler frequency component. This doppler frequency component is applied from homodyne receiver 108 as the doppler offset baseband video signal input to correlation decoding means 110.

Corresponding to any encoded modulating signal produced by encoding and decoding signal sources 100 is at least one decoding signal. This decoding signal is applied as a reference input to correlation decoding means 110. In certain cases, as in either the all range or range bins mode of the system disclosed in the aforesaid U.S. Pat. No. 3,386,095, correlation decoding means 110 is operated continuously. When this is so, there is no need to ever blank correlation decoding means 110 and, therefore, encoding and decoding signal sources 100 does not provide a blanking signal. However, in other cases, such as in the system disclosed in the aforesaid U.S. Pat. No. 3,614,785 and in the system of the present invention, correlation decoding means 110 is operated discontinuously. In these other cases, encoding and decoding signal sources 100 provides a blanking signal to correlation decoding means 110 to disable correlation decoding means 110 at certain times to thereby permit correlation decoding means 110 to operate only intermittently to produce a doppler signal output therefrom. The doppler output from correlation decoding means 110, whether or not correlation decoding means 110 is operated continuously or discontinuously, is applied as an input to and is manifested by a doppler signal indicating means 112.

As more fully described in the aforesaid U.S. Pat. No. 3,386,095, when the moving target correlation radar system disclosed therein is operated in its all range mode, the encoded modulating signal is a square wave having a first frequency, such as 150 KHz for example, and the decoding signal is a square wave having a second frequency twice the first frequency, such as 300 KHz for example. In this all range mode of the system disclosed in the aforesaid U.S. Pat. No. 3,386,095 correlation decoder means 110 provides an output manifested by doppler signal indicating means 112 for all targets within a certain maximum range receiver by antenna 104. Furthermore, the electrical-power sensitivity of correlation decoding means 110 will vary substantially as the fourth power of the range to a target, so that the amplitude of the doppler signal output from correlation decoding means 110 will be substantially independent of the range to a target, i.e., correlation decoding means 110 will exhibit sensitivity time control (STC). Thus, in the all range mode, the moving target correlation radar detects the presence of a target, but does not give any indication of the range thereto.

In the range bins mode of the aforesaid U.S. Pat. No. 3,386,095, the encoded modulating signal comprises successive sequences of the same pseudo-random binary-bit code group. By way of example, this code group may consist of a series of 1,023 bits (the number of bits of a maximum-length pseudo-random code generated by a shift register having ten stages).

The corresponding locally derived decoding signal comprises the product of encoded modulating signal delayed selectively by an amount corresponding to the approximate range of a particular target multiplied by the encoded modulating signal then being transmitted. (The reason for this multiplication is to compensate for the effective multiplication which takes place in the balanced mixer of the homodyne receiver between the received target echo signal and the directly applied transmitted signal from transmitter 102.)

In the aforesaid U.S. Pat. No. 3,614,785, one-half of the bits in each code group sequence of the encoded modulating signal vary in binary value in a pseudo-random manner, while the bits of the other half of each group all have the same binary value. This type of encoding makes it possible to time-multiplex the all range function and the range bins function in the system of U.S. Pat. No. 3,614,785. Correlation decoding means 110, for the system of U.S. Pat. No. 3,614,785, includes two correlation decoders (one for each channel), each of which correlates the doppler signal input against separate decoding signal inputs from encoding and decoding signal sources 100. Furthermore, each of the two channels may employ its own doppler signal indicating means, such as an earphone for all range and an A.C. meter for range bins.

The present invention is directed to an improvement in the target-detection function of the moving target correlation radar, which replaces the all-range function. The range bins function of the moving target correlation radar of the present invention may be conventional. In this case, the range bins function of this moving target correlation radar may be performed in the manner disclosed in the aforesaid U.S. Pat. No. 3,386,095. Alternatively, the range bins function may be performed in the manner disclosed in either of my copending U.S. patent applications Ser. No. 368,660 (RCA 63,405) or Ser. No. 368,661 (RCA 63,506), filled on even date herewith and assigned to the same assignee as the present application.

Figure 2:
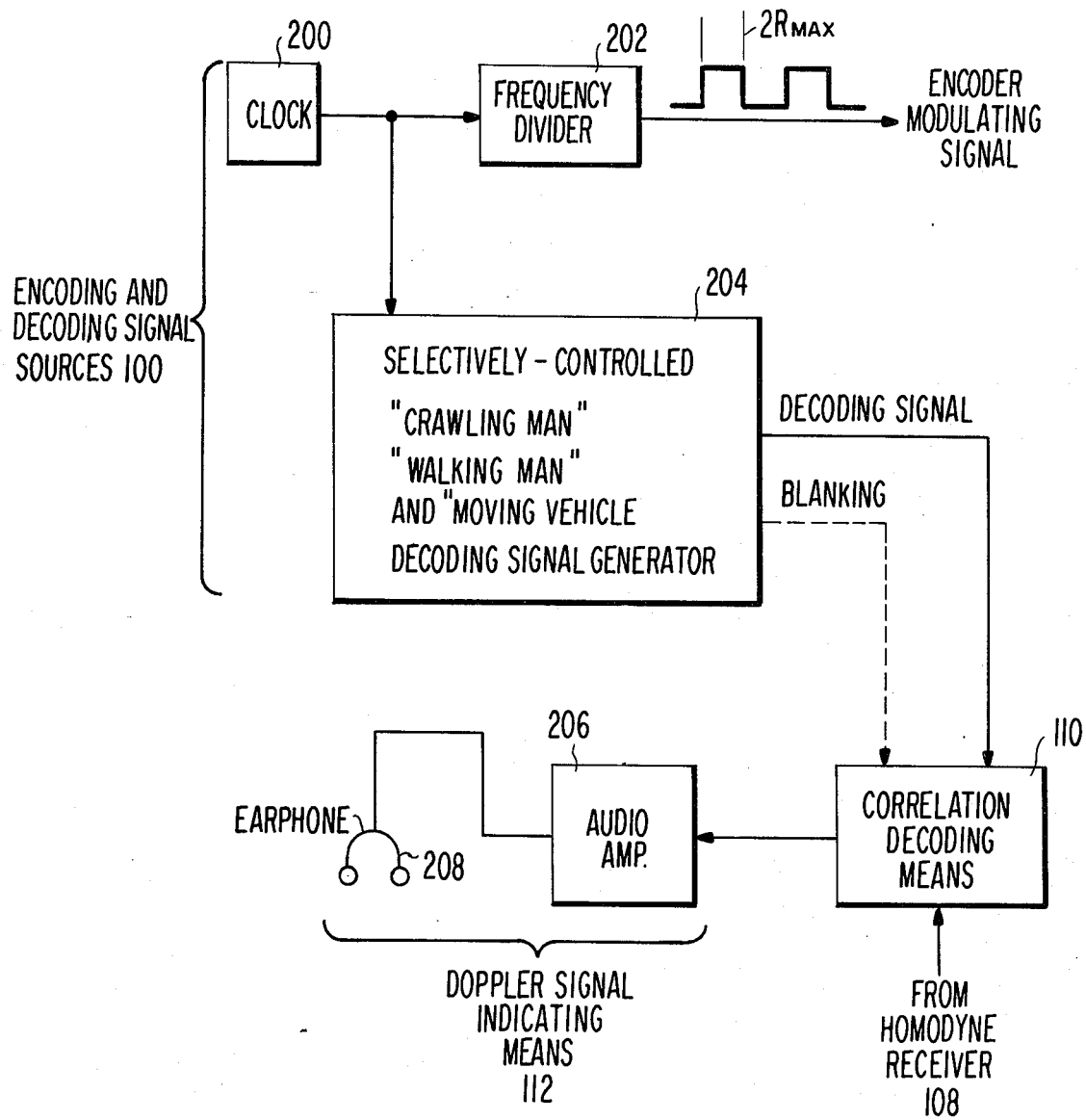
FIG. 2 is a functional block diagram of portions of the system of FIG. 1 embodying the present invention.

Referring now to FIG. 2, there is shown an embodiment of encoding and decoding signal sources 100, correlation decoder means 110 and doppler signal signal indicating means 112 for performing the target-detection function of a moving target correlation radar in accordance with the principles of the present invention.

FIG. 2 shows encoding and decoding signal sources 100 as consisting of clock 200, frequency divider 202 and selectively controlled "crawling man," "walking man," and "moving vehicle," decoding signal generator 204. By way of example, it will be assumed that clock 200 generates clock pulses at a repetition rate of 3.75 MHz, corresponding to a range resolution of 40 meters, and that the maximum range of interest, $R_{max}$, is about 5,000 meters, such as 5120 meters for instance. (The value 5,120 meters has been chosen solely for illustrative purposes because it corresponds to 128 clock periods, which happens to be evenly divisable by the values 2, 4 and 8. Although this simplifies the description of the invention, it is non-essential to the invention itself and is not intended to be in any way limiting.)

Frequency divider 202 derives a square wave output having a half-wave duration equal to $2R_{max}$, i.e., each square wave cycle has a first level for a duration equal to 256 clock periods followed by a second level for an additional 256 clock periods. The square wave output from frequency divider 202 constitutes the encoded modulating signal employed in FIG. 1 for phase modulating the transmitted carrier signal. The timing of the transmitted signal is indicated by graph 300 of FIG. 3. As shown in graph 302 of FIG. 3, the echo signal from an observed target at a range $R_T$ received by antenna 104 of FIG. 1 has the same waveform as transmitted signal 300, but is delayed with respect thereto by an amount $R_T$. The minimum value for $R_T$ is zero, while the maximum value for $R_T$ is $R_{max}$.

As described in more detail in the aforesaid U.S. Pat. No. 3,386,095, the mixing process performed by homodyne receiver 108, in effect, multiplies the received signal shown in graph 302 by the transmitted signal show in graph 300. Thus, the output from homodyne receiver 108, shown in graph 304 of FIG. 3, consists of a relatively negative portion having a duration $R_T$ (which results when the respective polarities of transmitted signal 300 and received signal 302 are different and a relatively positive portion having a duration $2R_{max}-R_T$ (which results when the respective polarities of transmitted signal 300 and received signal 302 are the same). As shown in both FIGS. 1 and 2, this output from homodyne receiver 108 is applied as the information signal input to correlation decoding means 110.

In FIG. 2, the clock pulses from clock 200 are also applied as an input to decoding signal generator 204. Decoding signal generator 204 is selectively-controlled either by manual means, such as a switch, or preferably by programmed automatic means, such as disclosed in FIG. 4, to alternatively provide respective decoding signal and blanking outputs from generator 204 which are a selected one of the three decoding waveforms shown respectively in graphs 306, 308 and 310 of FIG. 3. Both the decoding signal and blanking outputs of generator 204 are applied as inputs to correlation decoding means 110. During the presence of a blanking input thereto, correlation decoding means 110 is disabled so that no correlation takes place during this time. During the absence of a blanking input thereto, correlation decoding means 110 correlates the information input from homodyne receiver 108 against the particular decoding signal then being applied thereto.

Figure 3:
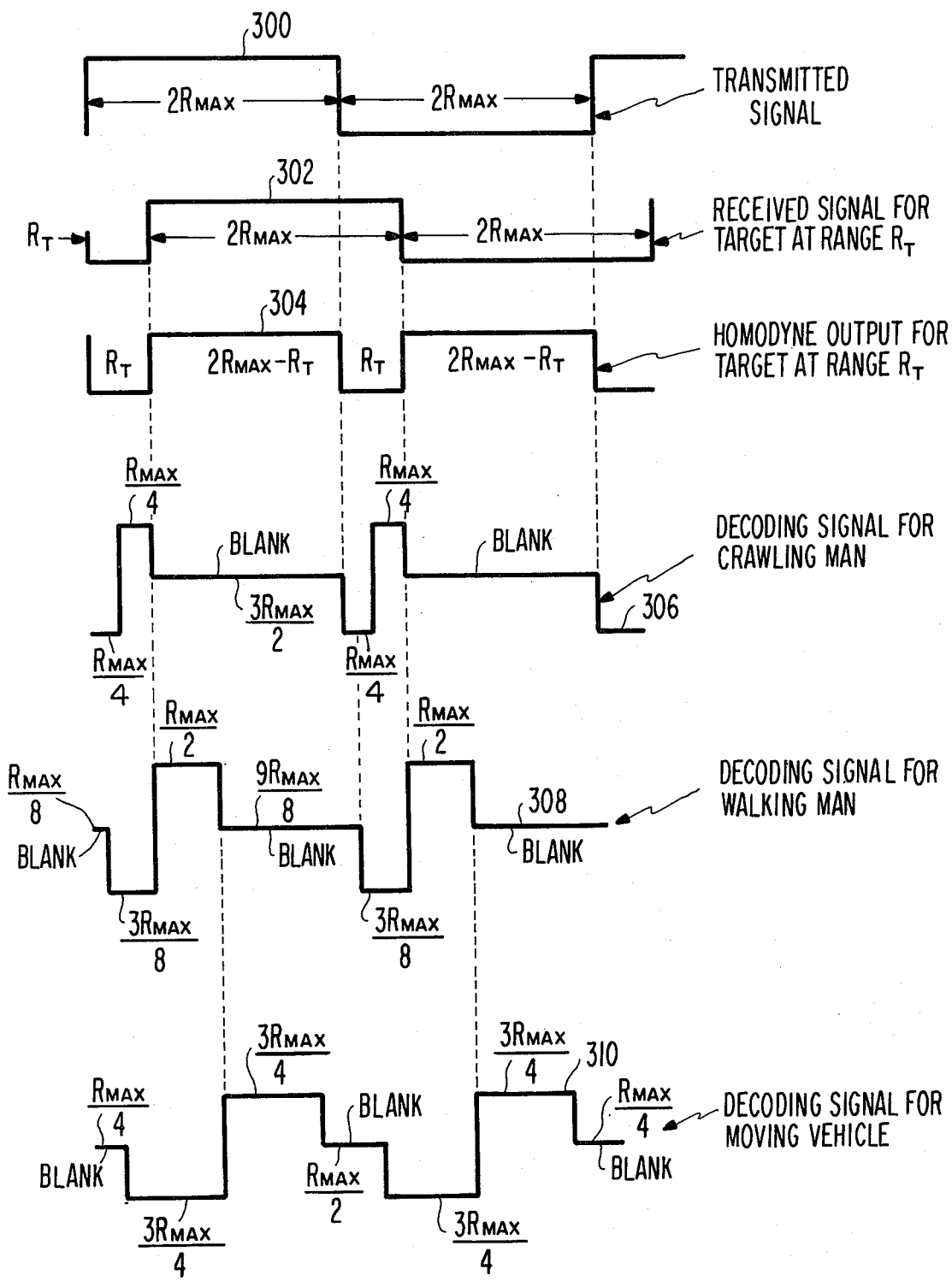
FIG. 3 is a timing diagram illustrating various signal wave shapes employed in the embodiment of FIG. 2.

The decoding signal for a crawling man, shown in graph 306 of FIG. 3, consists of a negative portion having its leading edge synchronous with the leading edge of the transmitted signal and having a duration equal to $R_{max}/4$. This negative portion is followed by a positive portion also having a duration of $R_{max}/4$, followed, in turn, by a blanking period of $3R_{max}/2$, after which the cycle is repeated. The decoding signal for a walking man, shown in graph 308 of FIG. 3, consists of a negative portion having a duration $3R_{max}/8$, followed by a positive portion having a duration of $R_{max}/2$. The leading edge of the negative portion is preceeded by a blank period for $R_{max}/8$ with respect to the leading edge of the transmitted signal. Following the positive portion, there is another blank period of $9R_{max}/8$ before the beginning of the next negative portion of the decoding signal for a walking man. The decoding signal for moving vehicles, shown in graph 310 of FIG. 3 consists of a negative portion having a duration of $3R_{max}/4$ followed by a positive portion having a duration of $3R_{max}/4$. The first negative portion of decoding signal of graph 310 is preceeded by a blank period having a duration of $R_{max}/4$ with respect to the leading edge of the transmitted signal and the positive portion of graph 10 is followed by a blank period having a duration of $R_{max}/2$, after which the next cycle of the decoding signal occurs. The significance of these three different decoding signals, shown respectively in graphs 306, 308 and 310, is discussed in detail below in explaining the operation of the present invention.

Returning to FIG. 2, the output from correlation decoding means 110 is applied as an input to audio amplifier 206 of doppler signal indicating means 112 and the output thereof is listened to by a radar operator over earphones 208. As in the prior art, audio amplifier 206 may have a transmission characteristic which passes the entire range of audio doppler frequencies which may be obtained at the output of correlation decoding means 110.

Figure 4:
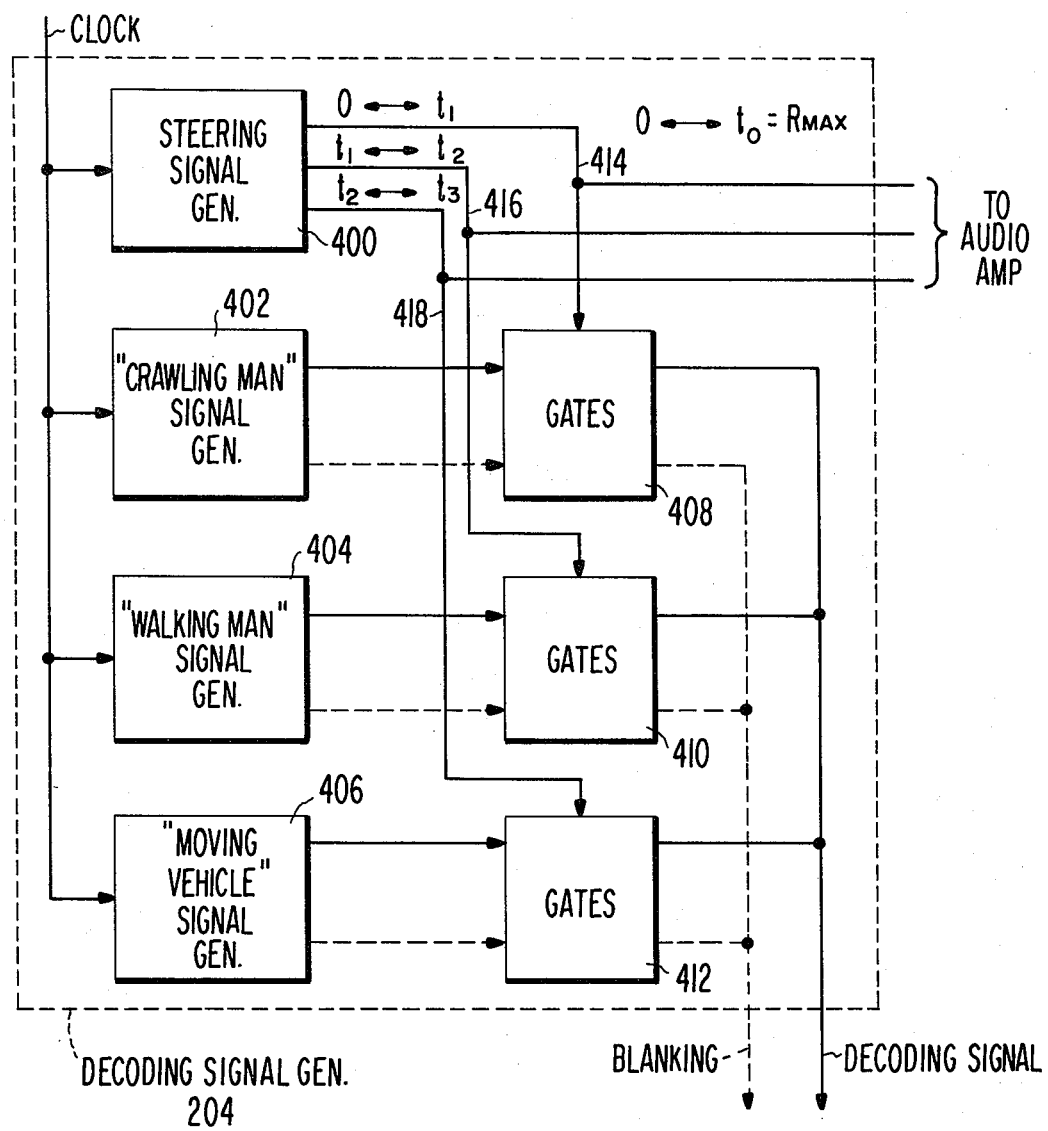
FIG. 4 is a functional block diagram of one embodiment of the decoding signal generator of FIG. 2.

Referring now to FIG. 4, there is shown a functional block diagram of a preferred embodiment of decoding signal generator 204. Generator 204 comprises steering signal generator 400, crawling man signal generator 402, walking man signal generator 404, moving vehicle signal generator 406 and respective gates 408, 410 and 412. Clock pulses from clock 200 are applied as inputs to generators 400, 402, 404 and 406. In response thereto, signal generator 402 generates the decoding signal and blanking signal shown in graph 306 of FIG.

3, which are applied as inputs to normally closed gates 408. In a similar manner, signal generator 404 and signal generator 406 apply decoding and blanking signals corresponding respectively to graphs 308 and 310 of FIG. 3 as inputs to normally closed gates 410 and 412, respectively. During a first subinterval, extending from time zero to time $t_1$, gates 408, associated with crawling man signal generator 402, are open by a control signal applied as an input thereto over conductor 414 from steering signal generator 400. During a second subinterval, extending from time $t_1$ to time $t_2$, gates 410, associated with walking man signal generator 404, are opened by a control input applied thereto over conductor 416 from steering signal generator 400. During a third subinterval, extending from time $t_2$ to time $t_3$, gates 412, associated with moving vehicle signal generator 406, are opened by a control input applied thereto over conductor 418 from steering signal 400. As indicated in FIG. 4, the entire time interval from time zero to time $t_3$ is equal to a time corresponding to the range of a target at the maximum range of interest, $R_{max}$. The three subintervals into which the time duration corresponding to $R_{max}$ is divided by the steering signal generator 400 are contiguous with each other and nonoverlapping. Thus, although the respective decoding signal outputs of gates 408, 410 and 412 are connected in common and the respective blanking outputs of gates 408, 410 and 412 are connected in common, as shown in FIG. 4, only the decoding signal output and blanking signal output from a single one of gates 408, 410 and 412 will be present at any one time.

It is realized that in practice, the respective functions performed by each of the various blocks in FIG. 4 need not be performed by separate, distinct and mutually exclusive generators and/or gates, and that it would be more efficient to employ one overall logic means utilizing at least some components in common to alternatively generate in proper sequence the different decoding and blanking signals generated by generators 402, 404 and 406. However, the functional block diagram of FIG. 4 is particularly useful for the purpose of explaining the principles of the present invention.

Figure 5:
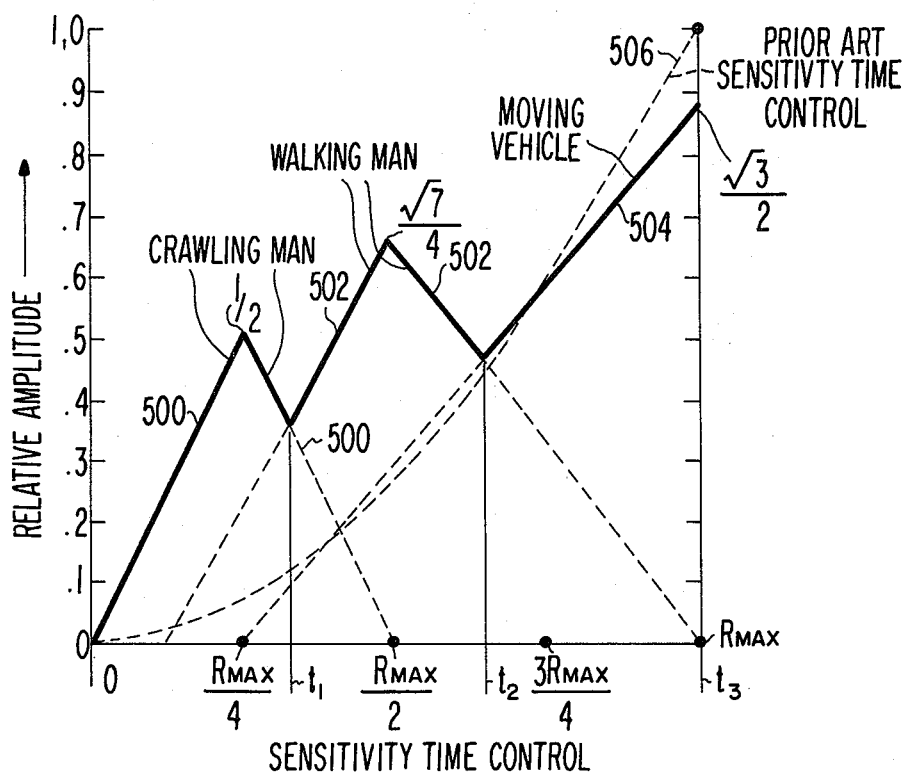
FIG. 5 is a sensitivity time control graph helpful in explaining the operation of the present invention.

Referring to FIG. 5, there is shown a sensitivity time control (STC) graph in which relative amplitude (corresponding to the square root of electrical power) is the ordinate and range is the abscissa. Plotted in FIG. 5 are the sensitivity time controls associated respectively with the crawling man decoding signal, the walking man decoding signal, and the moving vehicle decoding signal. In addition, FIG. 5 includes a plot of the prior-art sensitivity time control, such as that employed in the correlation radar system disclosed in the aforesaid U.S. Pat. No. 3,386,095.

The operation of the present invention, as disclosed in FIGS. 2 and 4, will now be discussed with the help of the graphs shown in FIGS. 3 and 5. The sensitivity with which correlation decoding means 110 detects a received information signal from homodyne receiver 108 depends both on the portion of the total time that correlation decoding means 110 is disabled by the presence of a blanking signal and, during the time correlation decoding means 110 is enabled, the amount of correlation which exists between the applied decoding signal and the target at range $R_t$ being then observed. If, as is the case for graph 306 of FIG. 3 associated with the crawling man decoding signal, correlation decoding means 110 is disabled for three quarters of the total time and enabled for only one quarter of the total time, the maximum electrical power of the output from correlation decoding means 110, obtained only when 100 percent correlation exists between the decoding signal and the observed target, is still only one-quarter of that obtainable with 100 percent correlation were correlation decoding means 110 not blanked. Since signal amplitude is proportional to the square root of electrical power, the maximum amplitude of the output of correlation decoding means 110, for crawling man decoding signal 306, is one-half (the square root of one-quarter) that obtainable were correlation decoding means 110 not blanked. Similarly, in the case of the walking man decoding signal 308 of FIG. 3, where correlation decoding means 110 is blanked for nine-sixteenths of the total time and is enabled only for seven-sixteenths of the total time, the maximum amplitude is $\sqrt{7/4}$ of that which would be obtained with 100 percent correlation if correlation decoding means 110 were not blanked. In the case of the moving vehicle decoding signal, where correlation decoding means 110 is blanked for one-quarter of the total time and is enabled for three-quarters of the total time, the maximum aplitude of the output correlation decoding means 110 is $\sqrt{3}/2$ of that which would be obtained with 100 percent correlation if correlation decoding means 110 were not blanked.

The output from correlation decoding means 110 has its maximum aplitude only when the correlation between the observed target and the decoding signal is 100 percent during the entire portion of the time in which correlation decoding means 110 is enabled. When this correlation is less than 100 percent, the amplitude of the output of correlation decoding means 110 is proportionately reduced. This is illustrated in the sensitivity time control graph of FIG. 5. Specifically, comparing the crawling man decoding signal of graph 306 with that of the homodyne output for a target at range $R_t$ shown in graph 304 shows that zero correlation exists for a target at zero range. Therefore, as shown in crawling man sensitivity time control 500, the relative amplitude of the output from correlation decoding means 110 at range zero is zero. However, as the observed range to a target increases from zero to $R_{max}/4$, the amount of correlation (sensitivity) increases to 100 percent, so that a range of $R_{max}/4$, the relative amplitude of crawling man graph 500 reaches it maximum value of one-half. At greater ranges, the percentage correlation and relative amplitude decrease linearly back to zero at a range of $R_{max}/2$.

Comparing walking man decoding signal graph 308 with graph 304 shows that the walking man sensitivity time control graph 502 rises linearly from a relative amplitude and correlation of zero at a range of $R_{max}/8$ to a maximum (100 percent correlation) of $\sqrt{7/4}$ at $R_{max}/2$, and then decreases linearly back to zero at $R_{max}$.

Comparing the moving vehicle decoding signal of graph 310 with graph 304, shows moving vehicle sensitivity time control graph 504 has a relative amplitude and correlation of zero at $R_{max}/4$ and then increases linearly to a maximum of $\sqrt{3/2}$ at $R_{max}$.

In the prior art, where only a single sensitivity time control is employed, the relative amplitude is proportional to the square of range, as shown in prior art sensitivity time control graph 506. In this case, the highest sensitivity of the system (having a relative amplitude of 1.0) is employed for a target having the maximum range $R_{max}$. However, this sensitivity of the system is reduced to a relative amplitude of one-quarter for a target having a range $R_{max}/2$ and is reduced to a relative amplitude of one-sixteenth for a target having a range $R_{max}/4$. The reason for this is that the received electrical power of an echo from a target is inversely proportional to the fourth power of the range of that target, and, hence, the amplitude of the received echo signal is inversely proportional to the square of the range of that target. Therefore, the prior art sensitivity time control shown in graph 506 just compensates for the difference in received signal strength due to the range of an observed target. It should be noted that at relatively short ranges, the sensitivity of a system employing the prior-art sensitivity time control of graph 506 is quite small.

Returning to FIG. 2, if generator 204 is merely equipped with manual means for selecting any one of the three decoding signals, correlation decoding means 110 will have as its sensitivity time control characteristic a single one of the sensitivity time control characteristics shown in graphs 500, 502, and 504, respectively, in accordance with the particular one of the three decoding signals which has been manually selected. However, decoding signal generator 204 is preferably of the type shown in FIG. 4. In this latter case, the sensitivity time control of correlation decoding means 110 is that of graph 500 for a first subinterval extending from time zero to time $t_1$; is that of graph 502 for a second subinterval extending from time $t_1$ to time $t_2$, and is that of graph 504 for a third subinterval extending from time $t_2$ to time $t_3$. If, as shown in FIG. 5, time $t_1$ is selected to have that value at which the positive-sloped portion of walking man graph 502 intersects the negative-sloped portion of crawling man graph 500, and time $t_2$ is selected to have that value at which the positive-slope of moving vehicle graph 504 intersects the negative-slope portion of walking man graph 502, then, as indicated by the solid line portions of graphs 500, 502, and 504, the actual overall sensitivity time control of correlation decoding means 110 will be such that the selected one of the three decoding signals employed at any range provides a greater sensitivity than would be obtained if either of the other two or the three decoding signals were employed at that range. Furthermore, as shown in FIG. 5, during the first and second subintervals, devoted respectively to the detection of a crawling man and a walking man, the sensitivity is much higher than that provided by the prior art sensitivity time control shown in graph 506. Only in the velocity of the maximum range, $R_{max}$, is the snesitivity provided by the prior-art sensitivity time control shown in graph 506 greater than the sensitivity provided by the moving vehicle sensitivity time control, shown in graph 504, which is employed in the present invention in the vicinity of the maximum range $R_{max}$. Even then, the degradation of sensitivity in the vicinity of $R_{max}$ is quite small.

Figure 6:
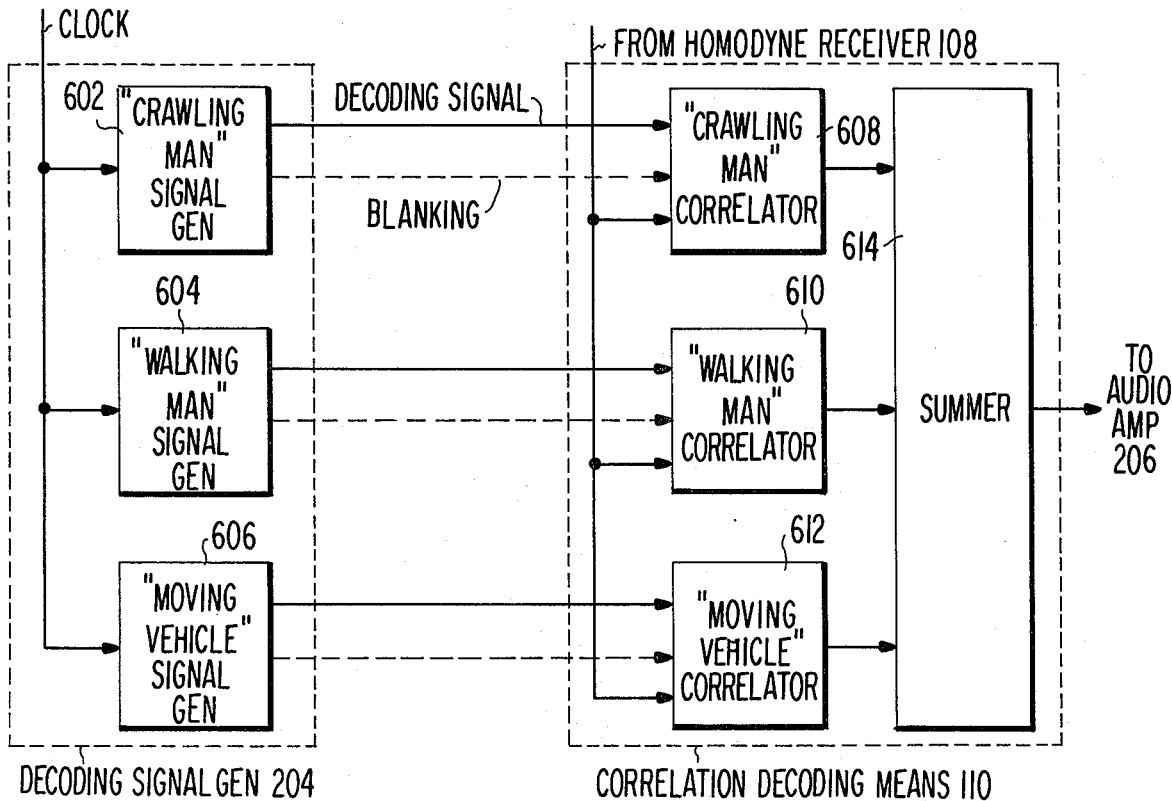
FIG. 6 is a block diagram of a modified embodiment of the present invention.

Referring now to FIG. 6, there is shown an alternative embodiment of the invention. In FIG. 6, decoding signal generator 204 consists of crawling man signal generator 602, walking man signal generator 604 and moving vehicle signal generator 606. Signal generator 602, 604, and 606 correspond identically in structure and function to signal generators 402, 404, and 406, respectively, of FIG. 4. However, the gates of FIG. 4 are eliminated in the embodiment of FIG. 6. Instead, the correlation decoding means 110 of the embodiment of FIG. 6 is divided into three corresponding decoding channels consisting of crawling man correlator 608, walking man correlator 610 and moving vehicle correlator 612. The decoding signal and blanking signal from each of signal generators 602, 604, and 606 are applied respectively, as shown, as inputs to the corresponding one of correlators 608, 610, and 612. The demodulator echo signal from homodyne receiver 108 is applied as a common signal input to all of correlators 608, 610, and 612. The respective outputs of correlators 608, 610, and 612 are applied as inputs to the summer 614. Thus, the decoding channels composed of correlators 608, 610, and 612 are effectively coupled in parallel and operate simultaneously to provide signals corresponding to graphs 500, 502, and 504 of FIG. 5 as respective inputs to summer 614. The output from summer 614 (which constitutes the output from correlation decoding means 110 that is applied as an input to audio amplifier 206) is proportional to the sum of the three input signals to summer 614.

Although not specifically shown in FIG. 6, it is evident to one skilled in the art that the embodiment of FIG. 6 can be provided with manual switch means for forwarding any selected one, or any selected two out of three, of correlators 608, 610, and 612 as the output from correlation decoding means 110, in addition to, or instead of, forwarding the sum of these correlators as the outputs from correlation decoding means 110.

What is claimed is:

1. In a moving target correlation radar system of the type comprising means for transmitting a continuous carrier wave modulated with a predetermined encoded modulating signal, means for demodulating echo signals received from any moving target within a given range illuminated with said transmitted signal, means for generating a decoding signal, and doppler-frequency means including correlation decoding means for correlating said demodulated echo signals against said decoding signal to derive an output signal from said correlation decoding means which includes the doppler-frequency signature of any moving target then being detected; the improvement wherein:

said moving targets comprise a predetermined plurality of different target types each having a distinctive doppler-frequency signature and a distinctive radar cross-section, and said decoding signal generating means includes means for applying to said correlation decoding means at least a selected one of a group of different predetermined decoding signals each of which has a format corresponding to a different target type, each of said respective formats of said different decoding signals only correlating with said demodulated echo signal over a different range subinterval of said given range with the range subinterval corresponding to a target type of relatively smaller radar cross-section being closer than the range subinterval corresponding to a target type of relatively larger radar cross section.

2. The system defined in claim 1, wherein the amount of correlation for each different decoding signal has a peak value for targets at a predetermined range within the range subinterval corresponding to that decoding signal, has a value of zero at ranges within said given range which are outside of the range subinterval corresponding to that decoding signal and has values which increase toward said peak value as the range within the range subinterval corresponding to that decoding signal approaches said predetermined range from either side.

3. The system defined in claim 2, wherein said different range subintervals partially overlap but with said predetermined range of peak value of correlation of each range subinterval being situated solely within its own range subinterval, and time-controlled means synchronized with said encoded modulating signal for switching said decoding signals in order at those respective instants of time at which the amount of correlation of the further of any two overlapping range subintervals becomes larger than the amount of correlation of the closer of these two overlapping range subintervals.

4. The system defined in claim 1, wherein said different target types comprise a crawling man, a walking man and a moving vehicle.

5. The system defined in claim 1, wherein said correlation decoding means includes a separate correlation decoding channel corresponding with each of said group of different predetermined decoding signals, said respective decoding channels being coupled in parallel to simultaneously correlate said demodulated echo the decoding signal with which that respective decoding channel corresponds, and means for adding the outputs from all said decoding channels to obtain a signal proportional to the sum thereof as said output signal from said correlation decoding means.

6. In a moving target correlation radar system of the type comprising means for transmitting a continuous carrier wave modulated with a predetermined encoded modulating signal, homodyne means for demodulating echo signals received from any moving target within a given range illuminated with said transmitted signal, means for generating a decoding signal, and doppler-frequency means including correlation decoding means for correlating said demodulated echo signals against said decoding signal to derive an output signal from said correlation decoding means which includes the doppler-frequency signature of any moving target then being detected; the improvement wherein:

said transmitting means includes means for generating a cyclic encoded modulating signal, each cycle of said encoded modulating signal including at least one pair of contiguous time periods each of which has substantially the same given duration, said encoded modulating signal having a relatively high level for the given duration of one of said pair of periods and a relatively low level for the given duration of the other of said pairs of periods, and said means for generating said decoding signal includes means for applying at least a selected one of a plurality of different predetermined cyclic decoding signals to said correlation decoding means, each cycle of any one of said decoding signals including first and second substantially identical pairs of contiguous time periods, one corresponding period of each of said first and second pairs having a relatively high level for the duration of that one corresponding period and the other corresponding period of each of said first and second pairs having a relatively low level for the duration of that other corresponding period, the duration of each of said first and second pairs of said one of said decoding signals of being less than said given duration, said first pair of periods of said one of said different decoding signals having a given phase relationship with respect to said one period of said encoded modulating signal and said second pair of periods of said one of said different decoding signals having the same given phase relationship with respect to said other period of said encoded modulating signal, the respective value of said given phase relationship for each different decoding signal being different from each other, and each of said different decoding signals including a blank portion which occurs during any part of said periods of said encoded modulating signal not occupied by said first and second pairs of that decoding signal.

7. The system defined in claim 6, wherein the duration of each of said first and second pairs for each different decoding signal is different from each other.

8. The system defined in claim 6, wherein the boundary between said contiguous periods of said first pair of said one decoding signal occurs at a given delay no greater than said given duration from the beginning of said one period of said encoded demodulating signal, the boundary between said contiguous periods of said second pair of said one decoding signal occurs at the same given delay from the beginning of said other period of said encoded modulating signal, and the value of said given delay for each different decoding signal is different from each other.

9. The system defined in claim 8, wherein said given duration corresponds to twice said given range and the value of said given delay corresponds to no greater than said given range.

* * * * *

UNITED STATES PATENT OFFICE
CERTIFICATE OF CORRECTION

PATENT NO. : 3,882,495

DATED : May 6, 1975

INVENTOR(S) : Thomas Vincent Bolger

It is certified that error appears in the above-identified patent and that said Letters Patent are hereby corrected as shown below:

Column 7, line 18, "signal 400" should read --signal generator 400--

Column 11, line 25, after "echo" insert --signals against--

Signed and Sealed this twenty-first Day of October 1975

[SEAL]

Attest:

RUTH C. MASON
*Attesting Officer*

C. MARSHALL DANN
*Commissioner of Patents and Trademarks*